United States Patent
Haggard

[11] Patent Number: 6,022,393
[45] Date of Patent: *Feb. 8, 2000

[54] AIR INDUCTION FILTER HOSE ASSEMBLY

[75] Inventor: Clifford D. Haggard, Fayetteville, N.C.

[73] Assignee: Purolator Products Company, Fayetteville, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/014,941

[22] Filed: Jan. 28, 1998

Related U.S. Application Data

[62] Division of application No. 08/804,244, Feb. 20, 1997, abandoned, which is a division of application No. 08/515,728, Aug. 16, 1995, Pat. No. 5,632,792.

[51] Int. Cl.⁷ .................................................. B01D 46/10
[52] U.S. Cl. ................................ 55/498; 55/500; 55/502; 55/521; 210/493.1; 210/493.3
[58] Field of Search .......................... 55/385.3, 497–502, 55/509, 511, 513, 521; 96/4, 6; 210/493.1, 493.5, 497.01, 497.2, 497.3

[56] References Cited

U.S. PATENT DOCUMENTS

| | | | |
|---|---|---|---|
| 2,319,894 | 5/1943 | Vokes | 55/521 X |
| 3,020,977 | 2/1962 | Huppke et al. | 55/498 X |
| 3,310,227 | 3/1967 | Milleron | 96/4 |
| 3,356,006 | 12/1967 | Scott | 55/521 X |
| 3,523,408 | 8/1970 | Rosenberg | 96/6 |
| 3,693,410 | 9/1972 | Robrecht et al. | 55/510 X |
| 3,803,810 | 4/1974 | Rosenberg | 96/6 |
| 3,847,577 | 11/1974 | Hansen | 55/385.3 |
| 3,941,697 | 3/1976 | Johnson | 210/167 |
| 3,958,967 | 5/1976 | Nakamura | 55/490 |
| 3,972,700 | 8/1976 | Gleockler et al. | 55/385.3 |
| 4,056,376 | 11/1977 | Schuldenfrei | 55/521 X |
| 4,062,781 | 12/1977 | Strauss et al. | 55/498 X |
| 4,133,661 | 1/1979 | Strnad | 55/497 |
| 4,493,717 | 1/1985 | Berger, Jr. et al. | 55/502 X |
| 4,504,294 | 3/1985 | Brighton | 55/502 |
| 4,509,966 | 4/1985 | Dimick et al. | 55/502 |
| 4,522,719 | 6/1985 | Kuwajima et al. | 55/521 X |
| 4,523,937 | 6/1985 | Brubaker | 55/509 |
| 4,826,517 | 5/1989 | Norman | 55/502 X |
| 4,925,561 | 5/1990 | Ishii et al. | 55/497 X |
| 5,106,397 | 4/1992 | Jaroszczyk | 55/70 |
| 5,125,940 | 6/1992 | Stanhope et al. | 55/385 |
| 5,263,503 | 11/1993 | St. Jean | 134/166 |
| 5,275,636 | 1/1994 | Dudley et al. | 55/274 |
| 5,318,608 | 6/1994 | Boone | 55/385.3 |
| 5,338,446 | 8/1994 | Schuman et al. | 210/169 |
| 5,632,792 | 5/1997 | Haggard | 55/502 X |

FOREIGN PATENT DOCUMENTS

| | | | |
|---|---|---|---|
| 2155355 | 9/1985 | United Kingdom | 55/497 |

*Primary Examiner*—Robert H. Spitzer
*Attorney, Agent, or Firm*—Barnes & Thornburg

[57] ABSTRACT

A filter assembly is formed of an impervious elongated tubular housing and an elongated filter member positioned within the housing with its opposed longitudinal edges sealed to the housing internal tubular surface. A first barrier is interposed between the filter member first surface and the housing internal tubular surface adjacent the housing inlet end and a second barrier is interposed between the filter member second surface and the housing internal tubular surface adjacent the housing outlet end. Air flowing into the housing inlet end passes through the filter member before exiting at the outlet end.

13 Claims, 2 Drawing Sheets

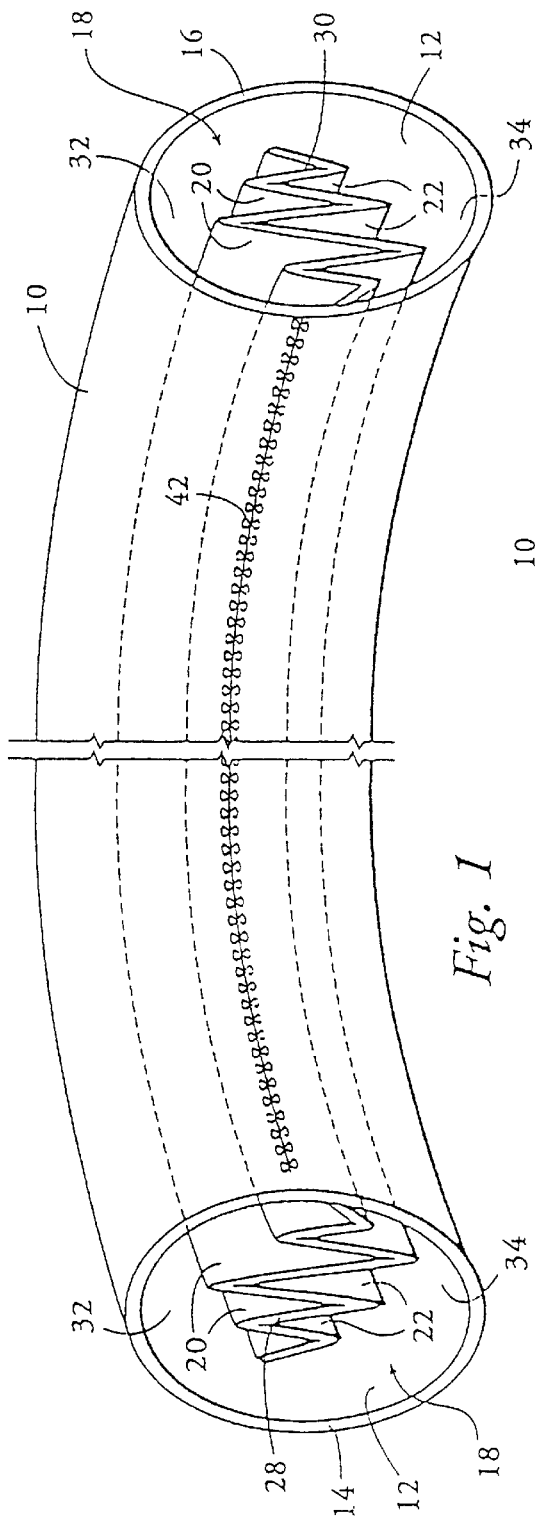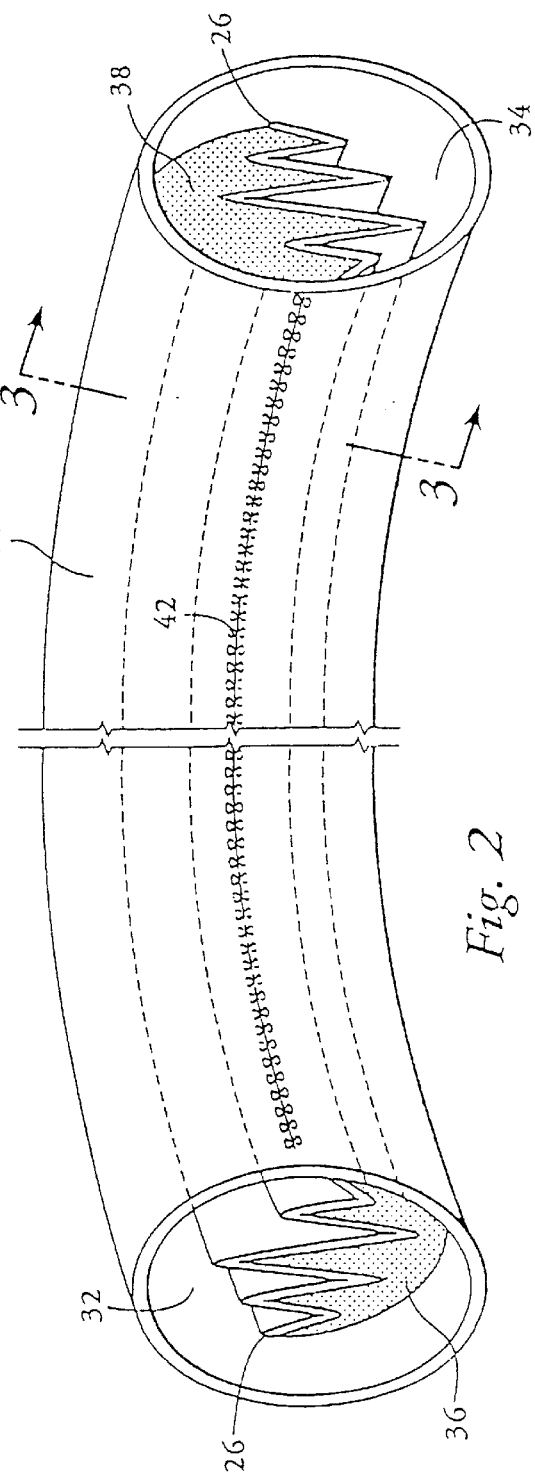

AIR INDUCTION FILTER HOSE ASSEMBLY

CROSS-REFERENCE TO RELATED APPLICATIONS

This application is a divisional patent application of its parent patent application, Ser. No. 804,244, filed Feb. 20, 1997, now abandoned, which in turn is a divisional patent application of Ser. No. 515,728, filed Aug. 16, 1995, now U.S. Pat. No. 5,632,792 issued May 27, 1997.

CROSS-REFERENCE TO MICROFICHE APPENDIX

This application is not related to any microfiche appendix.

BRIEF SUMMARY OF THE INVENTION

The invention is an air induction filter hose assembly that is particularly useful for filtering induction air for an internal combustion engine and most specifically, for use in an automobile, truck or bus application where space is limited around the engine.

The invention is a filter assembly in the form of an elongated impervious tubular housing that is preferably in the form of a semi-rigid elastomeric hose. The hose may be of various cross-sectional arrangements but preferably is circular to thereby allow maximum flexibility. An elongated filter member is positioned within the tubular housing. The filter member has opposed first and second surfaces, opposed longitudinal edges, a first and a second end. The longitudinal opposed edges of the filter member are sealed to the housing internal tubular surface. The edges of the filter member may be sealed by bonding, by adhesive or the edges can be encapsulated in the elastomeric material of which the tubular housing is formed. One method of manufacturing the filter assembly is to injection mold the tubular housing around the filter member to thereby encapsulate the longitudinal edges.

A first barrier is positioned within the tubular housing at the filter member first end. The first barrier is configured to sealably engage the filter member first surface and the interior tubular surface of the tubular housing that is opposed to the filter member first surface. The first barrier therefore leaves an open space at the filter member first end between the filter member second surface and the internal tubular surface of the housing.

In a similar manner, a second barrier is interposed between the filter member second surface and the housing internal tubular surface adjacent the filter member second end. Induction air entering the housing inlet end must pass through the filter member before exiting at the housing outlet end.

The filter member is preferably formed of a sheet of polyester non-woven filter media. Further, the filter member sheet is preferably pleated lengthwise to thereby substantially increase its cross-sectional area. The first and second barriers may be formed of impervious relatively thin plastic plates bonded at one edge to the filter media and at the opposed edge to the interior wall of the tubular housing. Another embodiment is to form the first and second barriers of filter material, such as a sheet of polyester non-woven filter media.

The filter hose of this invention preforms dual functions, when used as a part of a vehicle assembly having internal combustion engine, of first, conducting inlet air from a location within the vehicle to the engine intake system, and second, filtering such induction air without requiring a separate air filter housing.

A better understanding of the invention will obtained from the following description of the preferred embodiments, taken in conjunction with the attached drawings.

DESCRIPTION OF THE DRAWINGS

FIG. 1 is an elevational view of a filter hose assembly that incorporates the principles of this invention. The figure shows a tubular housing containing an elongated pleated filter member. The elongated edges of the filter member are affixed to the internal wall of the tubular housing. The tubular housing is shown curved, indicating that it may be semi-rigid or flexible. FIG. 1 is shown broken away since the length of the filter hose assembly can vary as required.

FIG. 2 is an external elevational view as shown in FIG. 1 but showing a first and a second barrier positioned within the interior of the tubular housing. The barriers form a flow path through the tubular housing requiring air entering the inlet end to flow through the filter member before exiting the outlet end.

DETAILED DESCRIPTION OF THE PREFERRED EMBODIMENTS

Figure 3:
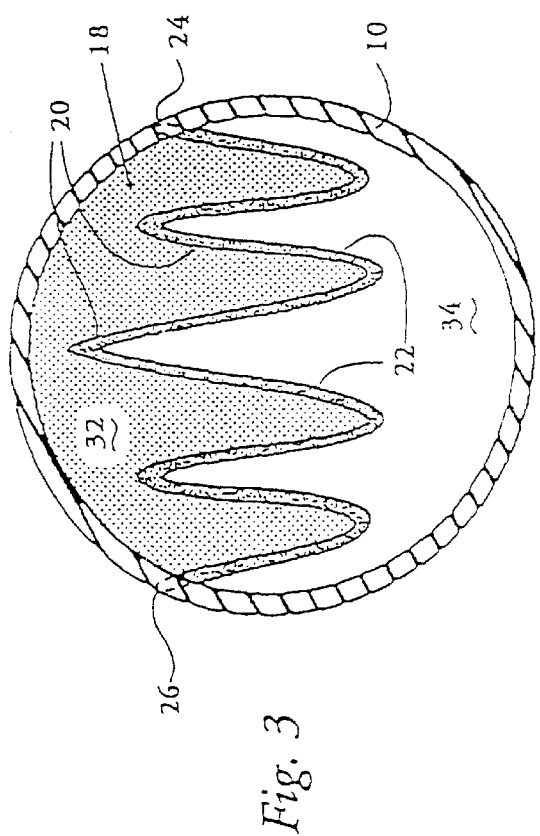
FIG. 3 is a cross-sectional view, taken along the line 3—3 of FIG. 2, showing the relationship between the tubular housing, the filter member and the outlet end barrier.

Referring to the drawings and first to FIGS. 1 and 2, the basic concepts of the invention are illustrated. An impervious elongated tubular housing 10 has an internal tubular surface 12, an inlet end 14 and an outlet end 16. Tubular housing 10 may be of a variety of cross-sectional configurations, such as square, elliptical, and so forth, however, a circular configuration as illustrated in FIGS. 1 and 2, except for special applications, is the preferred embodiment. By use of a circular cross-sectional configuration, tubular housing 10 can be made to be equally flexible in any direction thus more readily adapting the air induction filter hose assembly to a variety of spacial applications.

Tubular housing 10 is preferably formed of an elastomeric material. While housing 10 may be rigid or substantially rigid, the preferred embodiment is that housing 10 be semi-rigid, that is, the housing should have sufficient structural rigidity to substantially maintain its cross-sectional configuration but, at the same time, permit the housing to be bent or curved at least slightly along its longitudinal tubular axis so as to accommodate space requirements commonly encountered when the filter hose assembly is used to filter induction air for an internal combustion engine.

Positioned within tubular housing 10 is an elongated filter member 18. Filter member 18 has a first surface 20, an opposed second surface 22, opposed longitudinal edges 24 and 26 (best seen in FIG. 3), a first end 28 and second end 30. The length of filter member 18 is not greater than the length of tubular housing 10 and is illustrated as being somewhat shorter than that of tubular housing 10. Filter member first end 28 is adjacent tubular housing inlet end 14, and the second end 30 is adjacent tubular housing outlet end 16.

Longitudinal edges 24 and 26 are secured to tubular surface 12 of tubular housing 10. This can be accomplished such as by bonding with an adhesive or the tubular housing may be injection molded around the filter member 18 so that filter member edges 24 and 26 are encompassed within the tubular housing as illustrated in FIG. 3. Any mechanism by which the longitudinal edges of the filter member 18 are permanently secured to the interior wall is within the scope of this invention.

Filter member 18 divides the interior of tubular housing 10 into a first space 32 that exists between filter member first surface 20 and interior tubular surface 12 and, in like manner, a second space 34 that extends between the filter member second surface 22 and interior tubular surface 12 of the housing.

To define flow paths within the air induction hose assembly, a first barrier 36 is secured to the filter member second surface 22 adjacent first end 28 and to the internal tubular surface 12 of tubular housing 10 adjacent first end 14 (as seen at the left end of FIG. 2). In like manner, a second barrier 38 is secured between filter member first surface 20 and the interior tubular surface 12 of tubular housing 10 adjacent the filter member second end 30 adjacent to housing second end 16 (seen at the right hand end of FIG. 2).

The cross-sectional configuration of filter member 18 may vary considerably. In the preferred arrangement, filter member 18 is formed of a flat sheet of thick, high-loft polyester non-woven filter media. This flat sheet is preferably pleated as illustrated in the figures. Pleating is commonly employed in filtration equipment to substantially increase the cross-sectional area of the filter media. It is obvious that the cross-sectional area of the filter media for a given diameter and length of tubular housing can be dramatically increased by increasing the height of the pleating as well as the number of pleats employed.

First and second barriers 36 and 38 may be formed of thin impervious material, such as sheet plastic material, or may be formed of filter media, that is, formed of sheets of polyester non-woven filter media that is bonded to filter member 18 and internal tubular surface 12 of tubular housing 10.

Figure 4:
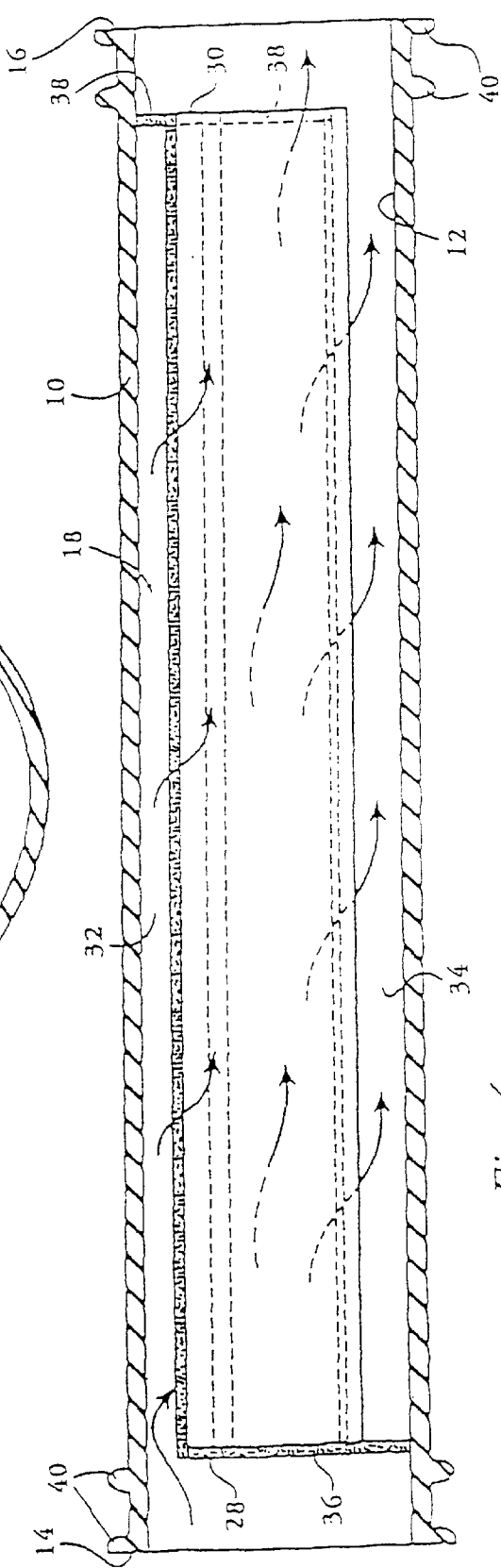
FIG. 4 is an elevational cross-sectional view of a straight tubular housing. By the use of arrows the flow paths through the housing are shown.

FIG. 4 illustrates, by arrows, the path of flow through the filter from the inlet end 14 to outlet end 16. The air induction filter hose assembly as illustrated and described herein is particularly adapted for use to provide induction air to an internal combustion engine such as for automobiles, trucks and so forth, however, the invention may be employed for purposes other than air filtration.

Filter member 18 may be supported by the use of top and bottom combs (not shown) or other kinds of standoff may be employed to provide structural rigidity of the filter member as necessary. Such combs or standoffs, when used, will be constructed so as to provide minimum interference with the flow paths.

The embodiment of FIG. 4 shows integral reinforcing ribs 40 formed adjacent the housing inlet and outlet ends 14 and 16. These are illustrative of the fact that the tubular housing may be designed to receive clamps or other apparatus by which the ends of the tubular housing may be attached to other components in an automobile or truck assembly or for other application. While not illustrated, the tubular housing, obviously, could include metallic or rigid plastic structural reinforcing components as an integral part thereof to maintain the configuration of the housing adjacent the ends for better connection to other apparatuses.

The air induction filter hose assembly as herein described offers many advantages over the standard type of air filtration used in automobiles, trucks and so forth. First, by combining the filtration system with an air induction hose, two functions are concurrently achieved by the same apparatus, thus reducing space and weight requirements. Second, the filtration system employed integrally with the air induction hose means that air velocity will be maintained at a substantially consistent rate throughout the induction passageway, as compared with other filtration systems wherein an induction hose connects to a housing in which a filter element is located.

As previously stated, edges 24 and 26 of the filter member can be bonded to or encompassed within the housing interior tubular surface. FIGS. 1 and 2 show, on the exterior surface of the tubular housing, areas 42 opposed to the interior surface where the filter member edges are embedded. As a practical matter, depending upon the type of construction employed, exterior visual indication of the area where the filter member edges are encompassed may or may not exist.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A unit for filtration of a fluid comprising:
    a housing having a passageway therethrough defined by an internal wall, the passageway having an inlet and an outlet;
    a pleated filter media having first and second ends and being secured within and sealably dividing said passageway into first and second channels;
    a discrete first barrier within said housing channel and sealably secured to said pleated filter media first end and sealably secured to a portion of said passageway internal wall and serving to close said first channel; and
    a discrete second barrier within said housing second channel and sealably secured to said pleated filter media second end and sealably secured to a portion of said passageway internal wall and serving to close said second channel, said barriers being spaced from each other providing a flow path therebetween through said filter media for the passage of a fluid flowing from said inlet to said outlet.

2. A unit for filtration of fluid according to claim 1 wherein said channels are substantially parallel to each other.

3. A unit for filtration of fluid according to claim 1 wherein, in a cross-section of the unit taken perpendicular to said passageway, said first and second channels are opposite to each other, separated only by said filter media.

4. A unit for filtration of fluid according to claim 1 wherein said first and second channels are, in at least one cross-section thereof, of substantially equal areas.

5. A unit for filtration of fluid according to claim 1 wherein said passageway through said housing is defined by an internal wall, the internal wall being substantially circular in cross-section.

6. A unit for filtration of fluid according to claim 1 wherein said housing and said filter media are both flexible.

7. A unit for filtration of fluid according to claim 1 wherein said passageway is elongated and said filter media is defined by longitudinal pleats parallel to said passageway's elongation.

8. A unit for filtration of fluid according to claim 1 wherein said first and second channels are, in at least some cross-sections taken perpendicular to said passageway, substantially semi-circular.

9. A filter assembly comprising:

a housing having a passageway therethrough defined by an internal surface, the passageway having an inlet and an outlets;

a pleated filter member having an undulating fluid contacting surface and an opposed undulating fluid exiting surface and opposed longitudinal edges, the pleated filter member being positioned within said housing with said longitudinal edges sealably engaging said passageway internal surface providing an inlet channel and an outlet channel defined by said filter member fluid contacting surface, said fluid exiting surface and said passageway internal surface;

a first barrier having an edge with a first undulating portion sealably contacting said filter member undulating fluid contacting surface and a second portion sealably contacting a portion of said housing internal surface, the first barrier closing said fluid inlet channel; and a second barrier having an edge with a first undulating portion sealably contacting said filter member undulating fluid exiting surface and a second portion sealably contacting a portion of said housing internal surface, the second barrier closing said fluid outlet channel, said barriers being spaced apart from each other providing, between said barriers, flow communication between said inlet and outlet channels through said pleated filter member.

10. A filter assembly according to claim 9 wherein said passageway is substantially circular in-cross-section.

11. A filter assembly according to claim 9 wherein said first barrier is adjacent said passageway inlet and said second barrier is adjacent said passageway outlet.

12. A filter assembly according to claim 9 wherein said housing is flexible.

13. A filter assembly according to claim 9 wherein said filter member is formed of a substantially planar filter media.

* * * * *